Dec. 13, 1966 N. J. BRAATEN 3,292,034
APPARATUS FOR SYNCHRONIZING CATHODE RAY DEFLECTION TO A ROTATING ANTENNA USING DIGITAL TECHNIQUES
Filed Sept. 27, 1963
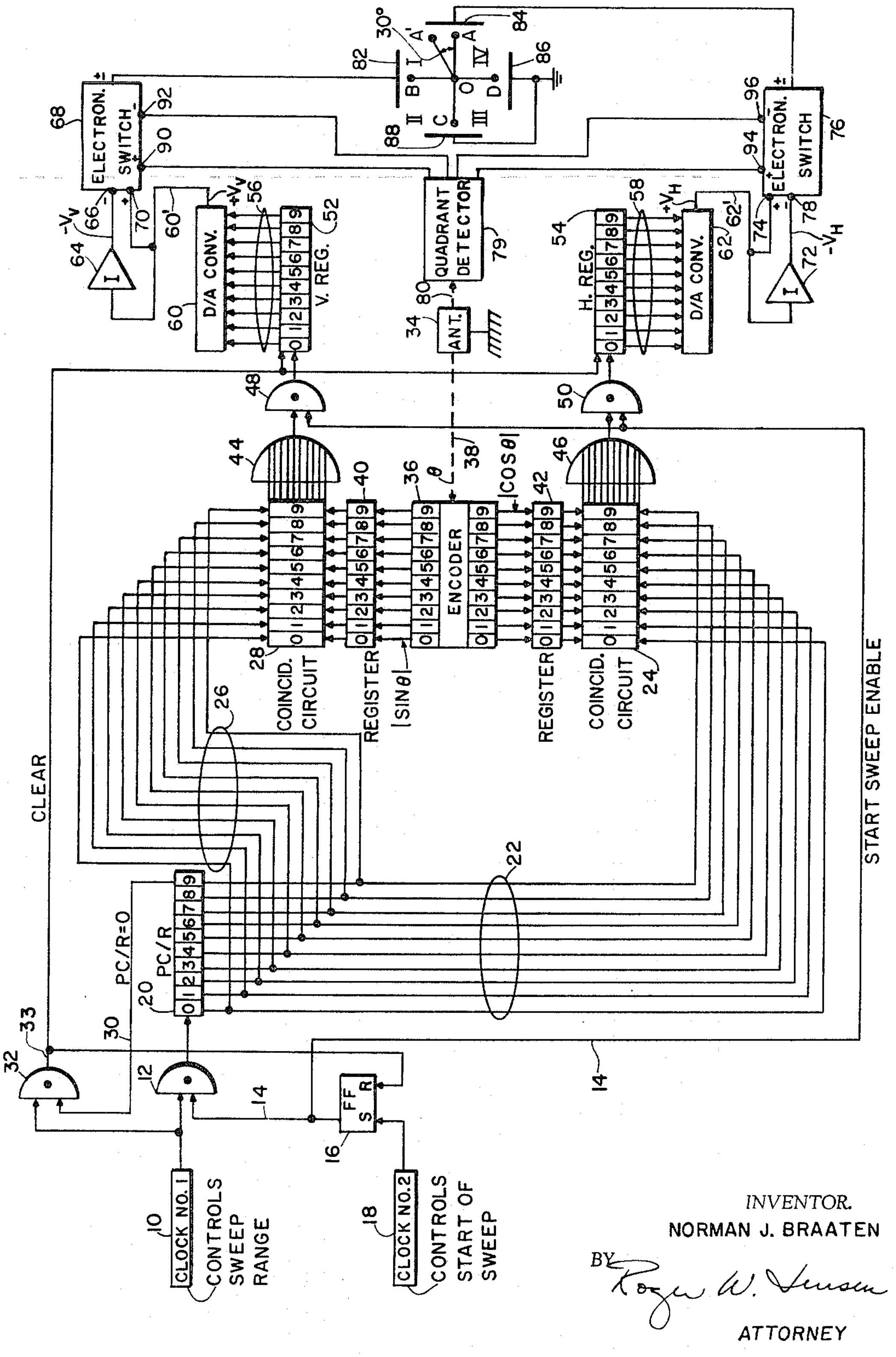
INVENTOR.
NORMAN J. BRAATEN
BY Roger W. Jensen
ATTORNEY

United States Patent Office 3,292,034

Patented Dec. 13, 1966

3,292,034

APPARATUS FOR SYNCHRONIZING CATHODE RAY DEFLECTION TO A ROTATING ANTENNA USING DIGITAL TECHNIQUES

Norman J. Braaten, Rosemount, Minn., assignor to Honeywell Inc., a corporation of Delaware Filed Sept. 27, 1963, Ser. No. 312,121
2 Claims. (Cl. 315—24)

This invention relates in general to a cathode ray tube (CRT) deflection system, and in particular to a CRT deflection system employing digital techniques and circuitry.

In the past it has been quite common to cause electron beam sweep and rotation with the use of a rotating electromagnetic yoke. In other cases a sawtooth voltage wavefore modulated by means of a synchro resolver has been used, but it is quite difficult to modulate a sawtooth waveform, having high frequencies, in a synchro resolver. Both of these methods depend upon rotating mechanical devices and because of this the accuracy of the system is limited. The present invention by the use of digital circuitry increases the accuracy of the CRT deflection system. Also in many modern applications systems are under the control of a digital computer or the system signals are processed by digital techniques. The system disclosed in the present invention is quite versatile and in such a modern application finds practical use.

Accordingly it is an object of this invention to provide a CRT deflection system which will integrate easily with digital computer control and digital signal processing.

It is another object of this invention to provide a CRT deflection system limiting the use of electromechanical resolvers.

It is a further object to provide a CRT deflection system which is primarily digital rather than analog.

It is yet a further object of this invention to provide a CRT deflection system where the accuracy is not limited by the modulation or multiplication process.

It is another object of this invention to provide a CRT deflection system where the linearity is not limited by modulation or multiplication process.

It is another object to provide a CRT deflection system where range rings and rectangular grids can be easily generated and displayed in the CRT.

Other objects and advantages of this invention will become apparaent hereinafter and in the drawing showing a functional block diagram of the system.

In disclosing one embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

The system will be described generally with the aid of the drawing. A clock 10 that is a source of high frequency periodic pulses, delivers pulses to one input of a two input AND gate 12. The other input to AND gate 12 is from the output line 14 of a flip-flop 16. Flip-flop 16 has set (S) and reset (R) input terminals. The S terminal is connected to a clock 18 which, as will be explained later in detail, has a pulse rate much lower than that of clock 10. Whenever a pulse from clock 18 is applied to the S input side of flip-flop 16 a signal is produced on output line 14 that is of the proper polarity to enable gate 12. When gate 12 is enabled a pulse applied to gate 12 from clock 10 is "gated" through and triggers a counter 20. In general, counter 20 may have $n$ stages where a stage is a single binary scaler and the input of each stage is connected to the output of the preceding stage. A binary scaler produces one output pulse for every two input pulses it receives. Assume that $n=10$ in counter 20, then the first stage in the counter 20 produces an output pulse for every two input pulses, the second stage, that receives an input from the output of the first stage, produces an output pulse for every four input pulses to the first stage, etc., and the tenth stage produces an output pulse for every 1024 input pulses to the first stage. A cable 22 consisting of ten lines, one line for each stage in counter 20, forms a means for transmitting the output of each stage in counter 20 to a corresponding stage in a coincidence circuit 24. A cable 26 similar to cable 22 and in parallel with it forms a means for transmitting the output of each stage in counter 20 to a corresponding stage in a coincidence circuit 28 that is similar to circuit 24. Counter 20 also produces an output pulse whenever it goes from a completely filled state to an empty state. This happens when counter 20 has received 1024 input pulses. Counter 20 is called the pulse counter register (PC/R) and the signal produced when the PC/R is cleared (empty state) is called the *PC/R=O* signal. This signal, transmitted on a line 30, enables one side of a double input AND gate 32. The other input to AND gate 32 is received from the output of clock 10. When signals are present on both input sides of AND gate 32 a CLEAR signal is produced at the output 33 of gate 32. The CLEAR signal has several uses. One of the uses is to reset flip-flop 16. When flip-flop 16 is reset it changes state and the potential on line 14 is such that gate 12 is not enabled and therefore the flow of pulses from clock 10 to counter 20 is shut off. The other use of the CLEAR signal is to clear registers 52, 54 at appropriate times. From the description up to this point it is seen that clock 18 controls the rate at which groups of 1024 pulse are applied to counter 20.

Also shown in the drawing is a rotating means, or object, 34, for example, a radar antenna. The angle $\theta$ which antenna 34 makes with respect to a reference direction, is transmitted to an encoder 36 by mechanical coupling means 38. Encoder 36 is a means for producing at least two digital signals, one signal representing $|\sin\theta|$ and the other signal representing $|\cos\theta|$. A general discussion of such an encoding device is contained in a book, "Notes on Analog-Digital Conversion Techniques," Alfred K. Susskind (ed.), The Technology Press, M.I.T., 1957, pp. 6–69, et. seq. The digital $|\sin\theta|$ signal is transmitted to a digital register 40 and the digital $|\cos\theta|$ signal is transmitted to a digital register 42. Encoder 36, registers 40, 42 and coincidence circuits 28, 24 all have 10 stages, corresponding to the number of stages in counter 20. The signals stored in registers 40, 42 are applied to coincidence circuits 28, 24.

Coincidence circuits 28, 24 each comprise ten AND gates. Each AND gate in coincidence circuits 28, 24 receives an input signal from a stage in registers 40, 42 respectively and another input signal from a stage in counter 20. The output signal from an AND gate in either coincidence circuit 28, 24, formed when two signals on separate input lines to an AND gate are coincident in time, is fed to an OR gate. The AND gates in coincidence circuit 28 feed OR gate 44 and the AND gates in coincidence circuit 24 feed OR gate 46. The OR gates 44, 46 may be thought of as "adders." They combine the pulses present on their respective input lines into a single pulse train. Not more than one signal is present on an input line to a single OR gate at one time.

The outputs of OR gates 44, 46 are fed to one of the inputs of double input AND gates 48, 50 respectively. The other input to each AND gate 48, 50 is connected to output line 14 of flip-flop 16. When flip-flop 16 is in a state such that AND gates 48, 50 are enabled, any signals at the other input to each of the gates 48, 50 are passed to the output of the gates 48, 50 where they are transmitted to digital registers 52, 54 respectively. Register 52 is called a vertical register and register 54 is called a horizontal register because they are in the vertical and horizontal channels respectively of a CRT deflection system. Each register 52, 54 stores the pulses appearing at the output of AND gates 48, 50 respectively. The registers 52, 54, in this case also have ten stages each. Registers 52, 54 are adapted to be cleared by a signal derived from the output 33 of AND gate 32 (CLEAR signal). A pair of suitable cable means 56, 58 link the registers 52, 54 to a pair of digital-to-analog converters 60, 62 respectively. Cable means 56, 58 each comprise ten lines, one line connected to an output of each stage in registers 52, 54 respectively. The other end of each line in cable means 56, 58 connects to a different point in converter 60, 62. Converter means 60, 62 may be one of several ordinary types, for example, the resistance ladder network type where different sections of a ladder network are switched in or out depending upon the state of the corresponding register stage. Digital-to-analog (D/A) converters 60, 62 function to produce an analog potential signal at their outputs 60' and 62' respectively, dependent upon the state of the registers 52, 53 at the time the conversion is made. Rather than talking about the state of a register or encoder, etc., it is common to talk about the number stored in the register, counter, etc., because each unique state can be said to correspond to a different number. The output signal of converter 60 is fed by means 60' to an inverter 64 that does not change the magnitude of the converter output signal but merely reverses the polarity, i.e., if $+V_1$ is applied to the input of inverter 60 then $-V_1$ will appear at the output of the inverter. The output signal produced by the inverter 64 is connected to a first signal input terminal 66 of an electronic switch 68. The output signal from the converter 60 is also directly connected by means 60' to a second signal input terminal 70 of switch 68. The output signal produced by converter 62 is used in much the same way that the signal from converter 60 is used. The output signal of converter 62 is used to drive an inverter 72, the output of which is fed to a first input signal terminal 78 of an electronic switch 76. The output signal produced by converter 62 is also directly connected to a second input signal terminal 74 of switch 76. Electronic switches 68, 76 each have two other input terminals that are all connected to an antenna quadrant detector unit 79 that is mechanically connected to antenna 34 by coupling means 80. The function of unit 79 is to provide proper switching signals to switches 68, 76. The switching signals determine which one of the two available input signals to an electronic switch is selected by the switch.

Shown at the right in the drawing are four CRT deflection plates 82, 84, 86, and 88. The plates 82, 86 (arranged horizontally in the drawing) provide vertical deflection for an electron beam, not shown, the deflection being in the plane of the drawing, when an electric potential gradient exists between them. Plate 86 is grounded and plate 82 is electrically connected to the output side of switch 68. The plates 84, 86 (arranged vertically in the drawing) provide horizontal electron beam deflection whenever an electric potential gradient exists between them. Plate 88 is grounded and plate 84 is electrically connected to the output side of switch 76. In this case deflections of the electron beam are measured from a center point (O) equidistant from all the plates. For purposes of explanation and illustration the space bounded by plates 82, 84, 86, and 88 is divided into four quadrants, I, II, III, and IV. A horizontal line AC passing through O is shown drawn between plates 84, 88 with point A being adjacent plate 84 which is to the right of plate 88. A vertical line BD passing through O and drawn at 90° to AC, is shown drawn between plates 82, 86, with point B being adjacent plate 82 which is above plate 86. The line segments OA, OB, OC, and OD are all shown as being of equal length. Quadrant I is the 90° quadrant bounded by AOB, quadrant II corresponds to BOC, quadrant III corresponds to COD, and quadrant IV corresponds to DOA. Each quadrant is numbered in a manner that is common in mathematics.

In discussing the system operation in more detail, an example using nominal values will be used. Assume the sweep length is represented by OA and that a radar set being used with the deflection system is set on the 50-mile (nautical) range. If a target is at 50 miles the time between a transmitter pulse and a returning echo is equal to the time ($t$) it takes electromagnetic energy to travel 100 miles (where the velocity of propagation of electromagnetic energy is equal to the velocity of light, $c$).

$$t = \text{round-trip distance}/c = 100 \text{ miles}/162{,}000 \text{ miles/sec.} = 617\ \mu\text{sec.}$$

From this it is seen that the time length of the sweep must be 617 $\mu$sec. If a sweep has a minimum time length of 617 $\mu$sec. then the maximum frequency the sweep may have is $$f_s\,(\text{max.}) = 1/t = 1620 \text{ c.p.s.}$$

Normally this value for a sweep frequency is higher than necessary due to the phosphorescence, etc., of the CRT.

Assume rather that the sweep is to make one revolution per five seconds or ⅕ r.p.s. and that for each degree of revolution the electron beam will be swept from the center to the edge of the CRT (e.g., along line OA) four times. From this it is seen that the sweep frequency $$f_s = \tfrac{1}{5}\cdot 4\cdot 360 = 288 \text{ c.p.s.}$$

Notice that this is $$288/1620 \times 100\% = 17.6\% \text{ of } f_s \text{ (max.)}$$

If $f_s$ equals 288 c.p.s. then $t_s$, the time length between the start of successive sweeps is $$t_s = 1/f_s = 3470\ \mu\text{sec.}$$

The electron beam is gated on and starts sweeping out from the center point O and approximately 617 $\mu$sec. later the beam reaches its end point (in 50-mile range mode) and is gated off until approximately $$(3470-617)\ \mu\text{sec.} = 2853\ \mu\text{sec.}$$

later when the beam is again gated on and begins to sweep. In other words, out of every 3470 $\mu$sec. the beam is on and sweeping for only 617 $\mu$sec.

The system event that signifies the beginning of a sweep is the production of a pulse by clock 18. This pulse sets flip-flop 16, producing a signal on output line 14 (start sweep signal) that enables AND gate 12. When AND gate 12 is enabled pulses from clock 10 are "ANDED" and passed through the counter 20 which gradually "fills." The time it takes for counter 20 to fill corresponds to the length of time for the electron beam to make one sweep (i.e., 617 $\mu$sec.). From this, the necessary frequency of clock 10 can be computed. Since counter 20 has been assumed to have ten stages it will take 1024 pulses to complete a counter cycle. The cycle begins with the counter 20 empty and continues as the count builds up to 1023 pulses. The counter cycle ends on the 1024th pulse which clears the counter. Therefore, during 617 $\mu$sec. the clock 10 must supply 1024 pulses or the frequency of clock 10

$$f(\text{clock } 10 = 1024/617\times 10^6 = 1660 \text{ k.c.p.s.}$$

The pulse which appears on output line 30 of counter 20 ($PC/R=O$ signal) is actually the output pulse produced by the tenth stage of the counter 20 upon receipt of every 1024th pulse by the counter. The $PC/R=O$ signal enables AND gate 32 so that the next pulse from clock 10 is transferred through gate 32 and resets flip-flop 16. Resetting flip-flop 16 removes the enable signal from output line 14 disabling AND gate 12 which stops the transmission of pulses to counter 20. The last described sequence of events beginning with the production of the $PC/R=O$ signal by counter 20 signifies the end of a sweep in the CRT that is substantially 617 μsec. long.

It is necessary now to describe the manner in which the pulses being transmitted from the counter 20 to the coincidence circuits 28, 24 are modulated. Before this is done it will be advantageous to describe encoder 36 further. The input angle $\theta$ transmitted from antenna 34 to encoder 36 by mechanical coupling means 38 is encoded in digital form by encoder 36. As examples, the binary digital code corresponding to sin $\theta$ when $\theta=0°$ might be 0.0000000000, then for $\theta=90°$ the code might very well be 0.1111111111. Notice that the digital code in this particular case has 10 binary digits, or bits, each bit corresponding to a different stage in the encoder and that the binary point is placed at the extreme left hand side of the code. Registers 40, 42 serve as storage elements and as buffers between coincidence circuits 28, 24 respectively and encoder 36. They store the digital numbers produced by the encoder 36.

Assume that the antenna 34 reference direction corresponds to the line OA between deflecting plates 88, 84, and that the angle $\theta$ that the antenna 34 is instantaneously making with the reference direction is 30° (see line OA'), and that the antenna is rotating counterclockwise (i.e. toward OB). If $V_2$ is the potential that must be applied to plate 84 in order to horizontally deflect the beam along OA it can be seen that with 30° counterclockwise rotation the potential necessary for the horizontal component of deflection is $V_2$ cos 30° and the potential that must be applied to plate 82 that is necessary for the vertical component of deflection, assuming horizontal and vertical deflection sensitivity are equal, is $V_2$ sin 30°. The register 40 is storing a binary number equivalent to $|\sin(+30°)|=\sin 30°$ and the register 42 a binary number equivalent to $|\cos(+30°)|=\cos 30°$. Sin 30° in straight binary code=0.1000000000 and cos 30°=0.1101110111. It will be assumed that when a stage of the registers 40, 42 is exhibiting a logical 1 ("1") the corresponding AND gate in the coincidence circuits 28, 24 respectively is enabled and any pulses transmitted to that particular stage of the coincidence circuits 28, 24 from counter 20 are gated through the coincidence circuit, through the OR gate 44 or the OR gate 46 and also since flip-flop 16 is set and producing a sweep enable signal on output line 14, AND gates 48, 50 are enabled and therefore any pulses appearing at the output of the coincidence circuit 28, 24 are completely gated through to registers 52, 54 respectively. In this case ½ of all 1024 pulses appearing on the counter 20 output cable 26, 512 pulses, will be transmitted through to the vertical register 52 (since sin 30=.5000) and approximately 87% of all pulses appearing on cable 22 of counter 20, 866 pulses, will be gated through to horizontal register 54 (since cos 30°=.8660).

Counter 20, coincidence circuit 28 and register 40 taken together are described as a binary rate multiplier. A binary rate multiplier is described in the book "Handbook of Automation, Computation, and Control," vol. 2, ed. by Grabbe, Ramo, and Wooldridge, published by Wiley, N.Y. 1961, pp. 29-05—29-08. Counter 20, coincidence circuit 24, and register 42 also form a binary rate multiplier.

The frequency of clock 18 corresponds to the sweep frequency $f_s$=288 c.p.s. computed earlier.

The quadrant detector unit 79 is necessary because the encoder 36, in this case, cannot differentiate between $+\theta$ and $-\theta$, i.e., the same digital number represents both angles, D/A converters 60, 62 have single polarity output signals, assumed positive here, but both positive and negative potentials must be used in deflecting the beam on both sides of the center point O. Quadrant detector 79 provides switching signals to two terminals 90, 92 and two terminals 94, 96 on switches 68, 76 respectively.

At this point it is worthy to mention the manner in which range markers and rectangular grid patterns can be generated for display on the face of the CRT along with the target information display.

It has been assumed that there are $n$ binary stages in counter 20, therefore, $2^n$ different states occur in the counter 20 as it progresses through a complete sequence. It would be very easy to modify counter 20 so that only some number of states N, less than $2^n$, are utilized in the counter sequence. In the example, ten ($n=10$) binary stages were used for explanation. Therefore, in the example $2^n=2^{10}=1024$ possible states in the counter sequence existed. Now for the sake of illustration, assume that counter 20 is modified to sequence through only 1000 states before it generates a PC/R signal and is cleared, or reset, to the initial state of the sequence. Let it be further assumed that five 10-mile range markers are desired. It is only necessary to "AND" the signals produced by the counter when it reaches the states corresponding to 200, 400, 600, 800, and 1000 respectively, with a control signal, thereby forming a marker signal, the marker signal being used to control the intensity of the electron beam.

To get a rectangular grid composed of a series of vertical and horizontal traces on the CRT face (where the traces have loci of the general form $OA \cos O=a$ constant, $OA \sin O=a$ constant) it is only necessary to "AND" the appropriate output signals from registers 42, 36 respectively, with a control signal, thereby producing grid signals, and controlling the intensity of the electron beam with the grid signals.

Thus, a deflection system is presented having, as an example, a sweep frequency of 288 c.p.s. and four sweeps per degree of revolution. The angular displacement of the rotating means, in this case an antenna, is converted to a digital quantity representing the absolute value of the sine and cosine of the angular displacement. A group of pulses, or a pulse train, representing the total sweep time is modulated separately by the digital sine and cosine representations after which the modulated pulse trains are converted to analog voltages for vertical and horizontal deflection of an electron beam in a CRT having horizontal and vertical deflection plates. A voltage of proper polarity is applied to the sets of deflection plates depending upon the actual value of the sine and cosine of the antenna angular displacement by sensing the quadrant the antenna is actually in, and switching an analog voltage of inverted sense to the deflection plates whenever this is necessary. This sensing operation can also be built into the digital circuitry, i.e., in the encoder and in the registers and converters by providing sign bits but this is equivalent to the system as it has been described.

It is to be understood that the form of the invention herein shown and described is to be taken as a single one of many possible embodiments. While a particular type of CRT deflection has been shown, the other type could easily be used, i.e., electromagnetic deflection. Then properly speaking signal currents, rather than signal voltages, would be used in reference to the type of deflection driving system. The method of deflection plate drive can assume other forms, e.g., push-pull drive. Various other changes can be made without departing from the spirit or scope of the invention as defined in the claims.

Having thus described my invention, I claim:

1. An apparatus for angularly sweeping an electron beam of a cathode ray tube in synchronism with a rotating means comprising:

a cathode ray tube including means for producing an electron beam, horizontal beam deflection means, and vertical beam deflection means;

means for producing a pair of digital signals representing the magnitudes of a pair of trigonometric functions respectively of the displacement angle of the rotating means, said angle being determined with respect to a reference and said angle being sequentially in four quadrants at a repetition rate indicative of the rate of rotation of the rotating means;

means for producing a pulse train co-extensive in time with a predetermined radial sweep time of the electron beam;

means for modulating said pulse train with the first of said pair of digital signals thereby providing a first modulated digital signal;

means for modulating said pulse train with the other of said first pair of digital signals thereby providing a second modulated digital signal;

means for converting said first and said second modulated digital signals to a pair of analog signals;

means for providing a second pair of analog signals having magnitudes corresponding to the magnitudes of said first pair of analog signals but of opposite sense;

means responsive to the instantaneous relationship of said angle and said quadrants for applying either the first of said pair of analog signals or its corresponding analog signal of opposite sense to said horizontal deflection means of the cathode ray tube; and means responsive to the instantaneous relationship of said angle and said quadrants for applying either the other of said first pair of analog signals or its corresponding analog signal of opposite sense to said vertical deflection means of the cathode ray tube.

2. A system for deflecting an electron beam in a cathode ray tube, having beam deflection plates, in angular synchronism with an antenna rotating about a fixed axis, comprising:

a combination pulse counter-register comprised of a predetermined number of cascaded binary scalers;

means operating in conjunction with the pulse counter-register to produce a pulse train having a total length in time substantially equal to a predetermined electron beam sweep time;

a first coincidence circuit and first register, the first coincidence circuit and first register together with the pulse counter-register interconnected to operate as a first binary rate multiplier;

a second coincidence circuit and a second register, said second coincidence circuit and said second register interconnected with said pulse counter-register to operate as a second binary rate multiplier;

means for producing a digital signal representing the magnitude of the sine of the angular displacement of the antenna and a digital signal representing the magnitude of the cosine of the angular displacement of the antenna, the sine signal forming the multiplier for the first binary rate multiplier and the cosine signal forming the multiplier for the second binary rate multiplier, the pulse train forming the multiplicand in both said first and second multipliers;

means for converting the output digital signals of the first and second binary rate multipliers respectively to analog voltages representing vertical deflection and horizontal deflection respectively;

means separately inverting the analog voltages; and, an electronic switch including an antenna quadrant detector for switching analog voltages of the proper polarity to the horizontal and vertical deflection plates of the cathode ray tube respectively.

References Cited by the Examiner

UNITED STATES PATENTS

| | | | |
|---|---|---|---|
| 2,272,070 | 2/1942 | Reeves | 179—15 |
| 2,529,823 | 11/1950 | Starr | 315—22 X |
| 3,087,087 | 4/1963 | McNaney | 315—8.5 |
| 3,134,974 | 5/1964 | Orenstein | 343—11 |

DAVID G. REDINBAUGH, *Primary Examiner.*

T. A. GALLAGHER, *Assistant Examiner.*